(12) United States Patent
Zhang et al.

(10) Patent No.: US 12,544,737 B2
(45) Date of Patent: Feb. 10, 2026

(54) HIGH NANOPORE VOLUME HYDROTREATING CATALYST AND PROCESS

(71) Applicant: CHEVRON U.S.A. INC., San Ramon, CA (US)

(72) Inventors: Yihua Zhang, Albany, CA (US); Guan-Dao Lei, Walnut Creek, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/550,116

(22) PCT Filed: Mar. 10, 2022

(86) PCT No.: PCT/US2022/019707
§ 371 (c)(1),
(2) Date: Sep. 11, 2023

(87) PCT Pub. No.: WO2022/192513
PCT Pub. Date: Sep. 15, 2022

(65) Prior Publication Data
US 2024/0149250 A1    May 9, 2024

Related U.S. Application Data

(63) Continuation of application No. 17/199,262, filed on Mar. 11, 2021, now Pat. No. 12,090,468.

(51) Int. Cl.
*B01J 23/44* (2006.01)
*B01J 21/04* (2006.01)
*B01J 21/12* (2006.01)
*B01J 23/42* (2006.01)
*B01J 35/63* (2024.01)
*B01J 35/64* (2024.01)
*C10G 45/52* (2006.01)

(52) U.S. Cl.
CPC ............... *B01J 23/44* (2013.01); *B01J 21/04* (2013.01); *B01J 21/12* (2013.01); *B01J 23/42* (2013.01); *B01J 35/633* (2024.01); *B01J 35/647* (2024.01); *C10G 45/52* (2013.01); *C10G 2300/1096* (2013.01); *C10G 2300/70* (2013.01)

(58) Field of Classification Search
None
See application file for complete search history.

(56) References Cited

U.S. PATENT DOCUMENTS

| 2,671,754 | A | * | 3/1954 | De Rosset | C10G 69/08 208/89 |
| 3,637,878 | A | | 1/1972 | Hansford et al. | |
| 5,393,408 | A | | 2/1995 | Ziemer et al. | |
| 6,225,359 | B1 | * | 5/2001 | O'Rear | C07C 1/0485 518/706 |
| 2015/0306583 | A1 | | 10/2015 | Zhang et al. | |
| 2016/0214094 | A1 | * | 7/2016 | Jia | B01J 35/30 |

FOREIGN PATENT DOCUMENTS

| RU | 2652990 C1 | 5/2018 | |
| RU | 2715713 C2 | 3/2020 | |
| WO | WO-02102939 A2 * | 12/2002 | B01J 21/12 |

OTHER PUBLICATIONS

International Search Report, issued on Jun. 14, 2022, during the prosecution of International Application No. PCT/US2022/019707.
Written Opinion of the International Searching Authority, issued on Jun. 14, 2022, during the prosecution of International Application No. PCT/US2022/019707.
Russia Office action mailed on Aug. 13, 2025 issued in Application No. 2023125856, filed on Oct. 10, 2023, with English translation, 22 Pages.

* cited by examiner

*Primary Examiner* — Keling Zhang
(74) *Attorney, Agent, or Firm* — Mark Warzel

(57) ABSTRACT

Hydrotreating catalyst and process for making a base oil product using a catalyst having a base comprising a high nanopore volume amorphous silica alumina (ASA) and an alumina. The amorphous silica alumina has a pore volume in the 11-20 nm pore diameter range of 0.2 to 0.9 cc/g and the alumina has a pore volume in the 11-20 nm pore diameter range of 0.01 to 1.0 cc/g, with the base formed from the ASA and the alumina having a total pore volume in the 2-50 nm pore diameter range of 0.12 to 1.80 cc/g. The catalyst comprises at least one modifier element from Groups 6 to 10 and Group 14 of the Periodic Table. The catalyst and process provide improved aromatics saturation.

21 Claims, No Drawings

HIGH NANOPORE VOLUME HYDROTREATING CATALYST AND PROCESS

CROSS REFERENCE TO RELATED APPLICATIONS

This application is related to the following applications, and claims the benefit of priority thereto, as a 371 application of PCT/US2022/019707, filed on Mar. 10, 2022, and as a continuation/divisional application of U.S. Ser. No. 17/199,262, filed Mar. 11, 2021, the disclosures of which are herein incorporated in their entirety.

FIELD OF THE INVENTION

A hydrotreating catalyst and process for producing base oils from hydrocarbon feedstocks using a catalyst comprising a base extrudate comprising a high nanopore volume amorphous silica alumina and an alumina.

BACKGROUND OF THE INVENTION

A hydroisomerization catalytic dewaxing process for the production of base oils from a hydrocarbon feedstock involves introducing the feed into a reactor containing a dewaxing catalyst system with the presence of hydrogen. Within the reactor, the feed contacts the hydroisomerization catalyst under hydroisomerization dewaxing conditions to provide an isomerized stream. Hydroisomerization removes aromatics and residual nitrogen and sulfur and isomerizes the normal paraffins to improve the cold flow properties. The isomerized stream may be further treated by contacting a hydrotreating and/or hydrofinishing catalyst with the stream to reduce or remove any aromatics and olefins, and to improve color, and/or other characteristics of the base oil product. Hydrotreating and/or hydrofinishing catalysts may include a support material and a noble metal, typically palladium, or platinum in combination with palladium.

Dewaxing of straight chain paraffins involves various hydroconversion reactions, including hydroisomerization, redistribution of branches, and secondary hydroisomerization. Consecutive hydroisomerization reactions lead to an increased degree of branching accompanied by a redistribution of branches. Increased branching generally increases the probability of chain cracking, leading to greater fuels yield and a loss of base oil/lube yield. Minimizing such reactions, including the formation of hydroisomerization transition species, can therefore lead to increased base oil/lube yield.

The challenges generally faced in typical hydroisomerization catalytic dewaxing processes include, among others, providing product(s) that meet pertinent product specifications, such as cloud point, pour point, viscosity and/or viscosity index limits for one or more products, while also maintaining good product yield. In addition, further upgrading, e.g., during hydrotreating/hydrofinishing, to further improve product quality may be used, e.g., for color and oxidation stability by saturating aromatics to reduce the aromatics content. The presence of residual organic sulfur, nitrogen, and aromatics from upstream hydrotreatment and hydrocracking processes, however, may have a significant impact on downstream processes and final base oil product quality.

More robust catalysts for base oil/lube production are therefore needed to provide good base oil/lube yield while also providing improved final product properties, such as, e.g., reduced product aromatics content.

SUMMARY OF THE INVENTION

This invention relates to a hydrotreating catalyst and process for converting wax-containing hydrocarbon feedstocks into high-grade products, including base or lube oils generally having a reduced aromatics content. Such processes employ a catalyst system comprising a base extrudate formed from a mixture of a high nanopore volume (HNPV) amorphous silica alumina (ASA) and a high nanopore volume (HNPV) alumina or from a mixture of a high nanopore volume (HNPV) amorphous silica alumina (ASA) and a non-high nanopore volume (non-HNPV) alumina. Catalysts formed from a base extrudate of HNPV ASA and HNPV alumina or from a base extrudate of HNPV ASA and non-HNPV alumina have been found to advantageously provide base oil products having a decreased base oil/lube product aromatic content as compared with base oil products produced using other catalysts.

In one aspect, the present invention is directed to a hydrotreating catalyst and process, which are useful to make dewaxed products including base oils, particularly base oil products of one or more product grades through hydroprocessing of a suitable hydrocarbon feedstream. While not necessarily limited thereto, one of the goals of the invention is to provide base oil products having reduced aromatics content while also providing a good product yield.

The catalyst generally comprises a base extrudate comprising an amorphous silica alumina (ASA) and an alumina. The amorphous silica alumina is a high nanopore volume (HNPV) support material based on the pore volumes within defined pore diameter ranges. The amorphous silica alumina is characterized as having a pore volume in the 11-20 nm pore diameter range of 0.2-0.9 cc/g. The alumina may also be an HNPV alumina, or may also be a non-HNPV alumina, or a combination thereof. The HNPV alumina is characterized as having a pore volume in the 11-20 nm pore diameter range of 0.2 to 1.0 cc/g. Non-HNPV alumina is generally an alumina having a pore volume in the 11-20 nm pore diameter range of less than about 0.2 cc/g. In general, suitable HNPV and non-HNPV aluminas have a pore volume in the 11-20 nm pore diameter range of 0.01 to 1.0 cc/g. The base extrudate comprising the HNPV ASA and the HNPV alumina has a total pore volume in the 2-50 nm pore diameter range of 0.12 to 1.80 cc/g. The catalyst further comprises at least one modifier selected from Groups 6 to 10 and Group 14 of the Periodic Table.

Use of the catalyst in a hydrotreating process generally comprises contacting a hydrocarbon feed with the hydrotreating catalyst under hydrotreating conditions to produce a product or product stream. The hydrotreating catalyst comprises a base extrudate that includes an HNPV amorphous silica alumina (ASA) and an HNPV alumina and/or a non-HNPV alumina. The ASA has a pore volume in the 11-20 nm pore diameter range of 0.2-0.9 cc/g, and the HNPV alumina has a pore volume in the 11-20 nm pore diameter range of 0.2 to 1.0 cc/g, while the non-HNPV alumina has a pore volume in the 11-20 nm pore diameter range of less than about 0.2 cc/g. The base extrudate has a total pore volume in the 2-50 nm pore diameter range of 0.12 to 1.80 cc/g. The catalyst comprises at least one modifier selected from Groups 6 to 10 and Group 14 of the Periodic Table.

DETAILED DESCRIPTION

Although illustrative embodiments of one or more aspects are provided herein, the disclosed processes may be implemented using any number of techniques. The disclosure is not limited to the illustrative or specific embodiments, drawings, and techniques illustrated herein, including any exemplary designs and embodiments illustrated and described herein, and may be modified within the scope of the appended claims along with their full scope of equivalents.

Unless otherwise indicated, the following terms, terminology, and definitions are applicable to this disclosure. If a term is used in this disclosure but is not specifically defined herein, the definition from the IUPAC Compendium of Chemical Terminology, 2nd ed (1997), may be applied, provided that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein is to be understood to apply.

"API gravity" refers to the gravity of a petroleum feedstock or product relative to water, as determined by ASTM D4052-11.

"Viscosity index" (VI) represents the temperature dependency of a lubricant, as determined by ASTM D2270-10 (E2011).

"Vacuum gas oil" (VGO) is a byproduct of crude oil vacuum distillation that can be sent to a hydroprocessing unit or to an aromatic extraction for upgrading into base oils. VGO generally comprises hydrocarbons with a boiling range distribution between 343° C. (649° F.) and 593° C. (1100° F.) at 0.101 MPa.

"Treatment," "treated," "upgrade," "upgrading" and "upgraded," when used in conjunction with an oil feedstock, describes a feedstock that is being or has been subjected to hydroprocessing, or a resulting material or crude product, having a reduction in the molecular weight of the feedstock, a reduction in the boiling point range of the feedstock, a reduction in the concentration of asphaltenes, a reduction in the concentration of hydrocarbon free radicals, and/or a reduction in the quantity of impurities, such as sulfur, nitrogen, oxygen, halides, and metals.

"Hydroprocessing" refers to a process in which a carbonaceous feedstock is brought into contact with hydrogen and a catalyst, at a higher temperature and pressure, for the purpose of removing undesirable impurities and/or converting the feedstock to a desired product. Examples of hydroprocessing processes include hydrocracking, hydrotreating, catalytic dewaxing, and hydrofinishing.

"Hydrocracking" refers to a process in which hydrogenation and dehydrogenation accompanies the cracking/fragmentation of hydrocarbons, e.g., converting heavier hydrocarbons into lighter hydrocarbons, or converting aromatics and/or cycloparaffins (naphthenes) into non-cyclic branched paraffins.

"Hydrotreating" refers to a process that converts sulfur and/or nitrogen-containing hydrocarbon feeds into hydrocarbon products with reduced sulfur and/or nitrogen content, typically in conjunction with hydrocracking, and which generates hydrogen sulfide and/or ammonia (respectively) as byproducts. Such processes or steps performed in the presence of hydrogen include hydrodesulfurization, hydrodenitrogenation, hydrodemetallation, and/or hydrodearomatization of components (e.g., impurities) of a hydrocarbon feedstock, and/or for the hydrogenation of unsaturated compounds in the feedstock. Depending on the type of hydrotreating and the reaction conditions, products of hydrotreating processes may have improved viscosities, viscosity indices, saturates content, low temperature properties, volatilities and depolarization, for example. The terms "guard layer" and "guard bed" may be used herein synonymously and interchangeably to refer to a hydrotreating catalyst or hydrotreating catalyst layer. The guard layer may be a component of a catalyst system for hydrocarbon dewaxing, and may be disposed upstream from at least one hydroisomerization catalyst.

"Catalytic dewaxing", or hydroisomerization, refers to a process in which normal paraffins are isomerized to their more branched counterparts by contact with a catalyst in the presence of hydrogen.

"Hydrofinishing" refers to a process that is intended to improve the oxidation stability, UV stability, and appearance of the hydrofinished product by removing traces of aromatics, olefins, color bodies, and solvents. UV stability refers to the stability of the hydrocarbon being tested when exposed to UV light and oxygen. Instability is indicated when a visible precipitate forms, usually seen as Hoc or cloudiness, or a darker color develops upon exposure to ultraviolet light and air. A general description of hydrofinishing may be found in U.S. Pat. Nos. 3,852,207 and 4,673,487.

The term "Hydrogen" or "hydrogen" refers to hydrogen itself, and/or a compound or compounds that provide a source of hydrogen.

"BET surface area" is determined by $N_2$ adsorption at its boiling temperature. BET surface area is calculated by the 5-point method at $P/P_0$=0.050, 0.088, 0.125, 0.163, and 0.200. Samples are first pre-treated at 400° C. for 6 hours in the presence of flowing, dry $N_2$ to eliminate any adsorbed volatiles, e.g., water or organics.

"Cut point" refers to the temperature on a True Boiling Point (TBP) curve at which a predetermined degree of separation is reached.

"Pour point" refers to the temperature at which an oil will begin to flow under controlled conditions. The pour point may be determined by, for example, ASTM D5950.

"Cloud point" refers to the temperature at which a lube base oil sample begins to develop a haze as the oil is cooled under specified conditions. The cloud point of a lube base oil is complementary to its pour point. Cloud point may be determined by, for example, ASTM D5773.

"Nanopore diameter" and "Nanopore volume" are determined by $N_2$ adsorption at its boiling temperature and calculated from $N_2$ isotherms by the BJH method described in E. P. Barrett, L. G. Joyner and P. P. Halenda, "The determination of pore volume and area distributions in porous substances. I. Computations from nitrogen isotherms." J. Am. Chem. Soc. 73, 373-380, 1951. Samples are first pre-treated at 400° C. for 6 hours in the presence of flowing, dry $N_2$ to eliminate any adsorbed volatiles, e.g., water or organics. Pore diameters at 10%, 50% and 90% of the total nanopore volume, referred to as $d_{10}$, $d_{50}$, and $d_{90}$, respectively, may also be determined from such $N_2$ adsorption measurements.

"TBP" refers to the boiling point of a hydrocarbonaceous feed or product, as determined by Simulated Distillation (SimDist) by ASTM D2887-13.

"Hydrocarbonaceous", "hydrocarbon" and similar terms refer to a compound containing only carbon and hydrogen atoms. Other identifiers may be used to indicate the presence of particular groups, if any, in the hydrocarbon (e.g., halogenated hydrocarbon indicates the presence of one or more halogen atoms replacing an equivalent number of hydrogen atoms in the hydrocarbon).

The term "Periodic Table" refers to the version of the IUPAC Periodic Table of the Elements dated Jun. 22, 2007, and the numbering scheme for the Periodic Table Groups is as described in Chem. Eng. News, 63(5), 26-27 (1985). "Group 2" refers to IUPAC Group 2 elements, e.g., magnesium, (Mg), Calcium (Ca), Strontium (Sr), Barium (Ba) and combinations thereof in any of their elemental, compound, or ionic form. "Group 6" refers to IUPAC Group 6 elements, e.g., chromium (Cr), molybdenum (Mo), and tungsten (W). "Group 7" refers to IUPAC Group 7 elements, e.g., manganese (Mn), rhenium (Re) and combinations thereof in any of their elemental, compound, or ionic form. "Group 8" refers to IUPAC Group 8 elements, e.g., iron (Fe), ruthenium (Ru), osmium (Os) and combinations thereof in any of their elemental, compound, or ionic form. "Group 9" refers to IUPAC Group 9 elements, e.g., cobalt (Co), rhodium (Rh), iridium (Ir) and combinations thereof in any of their elemental, compound, or ionic form. "Group 10" refers to IUPAC Group 10 elements, e.g., nickel (Ni), palladium (Pd), platinum (Pt) and combinations thereof in any of their elemental, compound, or ionic form. "Group 14" refers to IUPAC Group 14 elements, e.g., germanium (Ge), tin (Sn), lead (Pb) and combinations thereof in any of their elemental, compound, or ionic form.

The term "support", particularly as used in the term "catalyst support", refers to conventional materials that are typically a solid with a high surface area, to which catalyst materials are affixed. Support materials may be inert or participate in the catalytic reactions, and may be porous or non-porous. Typical catalyst supports include various kinds of carbon, alumina, silica, and silica-alumina, e.g., amorphous silica aluminates, zeolites, alumina-boria, silica-alumina-magnesia, silica-alumina-titania and materials obtained by adding other zeolites and other complex oxides thereto.

"Molecular sieve" refers to a material having uniform pores of molecular dimensions within a framework structure, such that only certain molecules, depending on the type of molecular sieve, have access to the pore structure of the molecular sieve, while other molecules are excluded, e.g., due to molecular size and/or reactivity. The term "molecular sieve" and "zeolite" are synonymous and include (a) intermediate and (b) final or target molecular sieves and molecular sieves produced by (1) direct synthesis or (2) post-crystallization treatment (secondary modification). Secondary synthesis techniques allow for the synthesis of a target material from an intermediate material by heteroatom lattice substitution or other techniques. For example, an aluminosilicate can be synthesized from an intermediate borosilicate by post-crystallization heteroatom lattice substitution of the Al for B. Such techniques are known, for example as described in U.S. Pat. No. 6,790,433. Zeolites, crystalline aluminophosphates and crystalline silicoaluminophosphates are representative examples of molecular sieves.

In this disclosure, while compositions and methods or processes are often described in terms of "comprising" various components or steps, the compositions and methods may also "consist essentially of" or "consist of" the various components or steps, unless stated otherwise.

The terms "a," "an," and "the" are intended to include plural alternatives, e.g., at least one. For instance, the disclosure of "a transition metal" or "an alkali metal" is meant to encompass one, or mixtures or combinations of more than one, transition metal or alkali metal, unless otherwise specified.

All numerical values within the detailed description and the claims herein are modified by "about" or "approximately" the indicated value, and take into account experimental error and variations that would be expected by a person having ordinary skill in the art.

In one aspect, the present invention is a hydrotreating catalyst, useful to make dewaxed products including base/lube oils having reduced aromatics content, the catalyst comprising a base extrudate formed from a high nanopore pore volume (HNPV) amorphous silica alumina (ASA) and a high nanopore pore volume (HNPV) alumina; wherein, the ASA has a pore volume in the 11-20 nm pore diameter range of 0.2-0.9 cc/g, and the HNPV alumina has a pore volume in the 11-20 nm pore diameter range of 0.2 to 1.0 cc/g. The base extrudate has a total pore volume in the 2-50 nm pore diameter range of 0.12 to 1.80 cc/g. The catalyst comprises at least one modifier selected from Groups 6 to 10 and Group 14 of the Periodic Table.

In another aspect, the present invention is a hydrotreating catalyst, useful to make dewaxed products including base/lube oils having reduced aromatics content, the catalyst comprising a base extrudate formed from a high nanopore pore volume (HNPV) amorphous silica alumina (ASA) and a non-high nanopore pore volume (non-HNPV) alumina; wherein, the ASA has a pore volume in the 11-20 nm pore diameter range of 0.2-0.9 cc/g, and the alumina has a pore volume in the 11-20 nm pore diameter range of less than about 0.2 cc/g. The base extrudate has a total pore volume in the 2-50 nm pore diameter range of 0.12 to 1.80 cc/g. The catalyst comprises at least one modifier selected from Groups 6 to 10 and Group 14 of the Periodic Table.

In a further aspect, the present invention concerns a hydrotreating process, useful to make dewaxed products including base oils having reduced aromatics content, the process comprising contacting a hydrocarbon feed with a hydrotreating catalyst under hydrotreating conditions to produce a product or product stream; wherein, the hydrotreating catalyst comprises a base extrudate formed from an and an alumina; wherein, the ASA has a pore volume in the 11-20 nm pore diameter range of 0.2-0.9 cc/g, and the alumina has a pore volume in the 11-20 nm pore diameter range of 0.2 to 1.0 cc/g. The base extrudate has a total pore volume in the 2-50 nm pore diameter range of 0.12 to 1.80 cc/g. The catalyst comprises at least one modifier selected from Groups 6 to 10 and Group 14 of the Periodic Table.

The amorphous silica alumina (ASA) used in the hydrotreating catalyst and process is generally referred to as a "high nanopore volume" amorphous silica alumina, abbreviated herein as "HNPV" amorphous silica alumina or "HNPV" ASA. The HNPV ASA may be conveniently characterized according to its pore volume within ranges of average pore diameters. The term "nanopore volume", abbreviated herein as "NPV", provides a convenient label to define pore volume ranges and values within those ranges for the ASA, e.g., NPV pore volumes in the 6-11 nm pore diameter range, 11-20 nm pore diameter range, and the 20-50 nm pore diameter range. In general, the ASA has a pore volume in the 11-20 nm pore diameter range of 0.2 to 0.9 cc/g, or, more particularly, a pore volume in the 11-20 nm pore diameter range of 0.25 to 0.8 cc/g, or a pore volume in the 11-20 nm pore diameter range of 0.3 to 0.7 cc/g. Independently, or in addition to the foregoing 11-20 nm ranges, the ASA may have a pore volume in the 6-11 nm pore diameter range of 0.1 to 1.2 cc/g, or a pore volume in the 6-11 nm pore diameter range of 0.2 to 1.0 cc/g, or a pore volume in the 6-11 nm pore diameter range of 0.3 to 0.9 cc/g. Independently, or in addition to the foregoing 6-11 nm and 11-20 nm ranges, the ASA may have a pore volume in the 20-50 nm pore diameter range of 0.05 to 0.7 cc/g, or a pore volume in the 20-50 nm pore diameter range of 0.1 to 0.6 cc/g or a pore volume in the 20-50 nm pore diameter range of 0.15 to 0.5 cc/g.

The HNPV ASA may also be characterized in terms of its total pore volume in a pore diameter range. For example, in addition to the foregoing NPV pore volumes, or separately and independently, the HNPV ASA may have a total pore volume in the 2-50 nm pore diameter range of 0.3 to 2.2 cc/g, or a total pore volume in the 2-50 nm pore diameter range of 0.4 to 2.1 cc/g, or a total pore volume in the 2-50 nm pore diameter range of 0.5 to 2.0 cc/g.

Suitable HNPV ASA's and non-HNPV ASA's are commercially available and known in the patent literature, including, e.g., in U.S. Pat. No. 10,183,282. One such family of ASA's include, e.g., SIRAL® ASA's from Sasol (Table 1).

TABLE 1

| Typical Properties | SIRAL 1 | SIRAL 5 | SIRAL 10 | SIRAL 20 | SIRAL 30 | SIRAL 40 |
|---|---|---|---|---|---|---|
| $Al_2O_3 + SiO_2$ (%) | 75 | 75 | 75 | 75 | 75 | 75 |
| Loss on Ignition, LOI (%) | 25 | 25 | 25 | 25 | 25 | 25 |
| $Al_2O_3$:$SiO_2$ % | 99:1 | 95:5 | 90:10 | 80:20 | 70:30 | 60:40 |
| C (%) | 0.2 | 0.2 | 0.2 | 0.2 | 0.2 | 0.2 |
| $Fe_2O_3$ (%) | 0.02 | 0.02 | 0.02 | 0.02 | 0.02 | 0.02 |
| $Na_2O$ (%) | 0.005 | 0.005 | 0.005 | 0.005 | 0.005 | 0.005 |
| Loose bulk density (g/l) | 600-800 | 450-650 | 400-600 | 300-500 | 250-450 | 250-450 |
| Particle size, d50 (μm) | 50 | 50 | 50 | 50 | 50 | 50 |
| Surface area, BET* ($m^2$/g) | 280 | 370 | 400 | 420 | 470 | 500 |
| Pore volume* (ml/g) | 0.50 | 0.70 | 0.75 | 0.75 | 0.80 | 0.90 |

*After activation at 550° C. for 3 hours

Non-HNPV amorphous silica aluminas, by comparison, have pore size distributions that are generally biased toward greater pore volume content in smaller pore diameter ranges. For example, such non-HNPV ASA's may typically have a pore volume in the 11-20 nm pore diameter range of less than about 0.2 cc/g, or less than about 0.18 cc/g, and/or a pore volume in the 20-50 nm pore diameter range of less than about 0.1 cc/g, or less than about 0.08 cc/g.

The alumina used in the hydrotreating catalyst and process may be an alumina that is generally referred to as a "high nanopore volume" alumina, abbreviated herein as "HNPV" alumina, and/or a conventional non-HNPV alumina. The HNPV alumina may be conveniently characterized according to its pore volume within ranges of average pore diameters. The term "nanopore volume" abbreviated herein as "NPV" provides a convenient label to define pore volume ranges and values within those ranges for the alumina, e.g., NPV pore volumes in the 6-11 nm pore diameter range, 11-20 nm pore diameter range, and the 20-50 nm pore diameter range. In general, the alumina has a pore volume in the 11-20 nm pore diameter range of 0.2 to 1.0 cc/g, or, more particularly, a pore volume in the 11-20 nm pore diameter range of 0.3 to 0.85 cc/g, or a pore volume in the 11-20 nm pore diameter range of 0.4 to 0.7 cc/g. Independently, or in addition to the foregoing 11-20 nm ranges, the alumina may have a pore volume in the 6-11 nm pore diameter range of 0.05 to 1.0 cc/g, or a pore volume in the 6-11 nm pore diameter range of 0.06 to 0.8 cc/g, or a pore volume in the 6-11 nm pore diameter range of 0.07 to 0.6 cc/g. Independently, or in addition to the foregoing 6-11 nm and 11-20 nm ranges, the alumina may have a pore volume in the 20-50 nm pore diameter range of 0.05 to 1.0 cc/g, or a pore volume in the 20-50 nm pore diameter range of 0.07 to 0.8 cc/g or a pore volume in the 20-50 nm pore diameter range of 0.09 to 0.6 cc/g.

The HNPV alumina may also be characterized in terms of its total pore volume in a pore diameter range. For example, in addition to the foregoing NPV pore volumes, or separately and independently, the HNPV alumina may have a total pore volume in the 2-50 nm pore diameter range of 0.3 to 2.0 cc/g, or a total pore volume in the 2-50 nm pore diameter range of 0.5 to 1.75 cc/g, or a total pore volume in the 2-50 nm pore diameter range of 0.7 to 1.5 cc/g.

Suitable non-HNPV aluminas have pore size distributions that are generally biased toward greater pore volume content in smaller pore diameter ranges. For example, such non-HNPV aluminas may typically have a pore volume in the 11-20 nm pore diameter range of less than about 0.2 cc/g, or less than about 0.18 cc/g, and/or a pore volume in the 20-50 nm pore diameter range of less than about 0.05 cc/g, or less than about 0.03 cc/g.

Suitable HNPV and non-HNPV alumina's are commercially available and known in the patent literature, including, e.g., in U.S. Pat. No. 10,183,282. One such family of alumina's include, e.g., CATAPAL® alumina's from Sasol (Table 2). PURAL® alumina's from Sasol may also be suitable.

TABLE 2

| Typical Properties | CATAPAL B | CATAPAL C1 | CATAPAL D | CATAPAL 200 |
|---|---|---|---|---|
| $Al_2O_3$ (wt. %) | 72 | 72 | 72 | 72 |
| $Na_2O$ (wt. %) | 0.002 | 0.002 | 0.002 | 0.002 |
| Loose bulk density (g/l) | 670-750 | 670-750 | 700-800 | 500-700 |
| Compacted bulk density (g/l) | 800-1100 | 800-1100 | 800-1100 | 700-800 |
| Particle size, d50 (μm) | 60 | 60 | 40 | 40 |
| Surface area, BET* ($m^2$/g) | 250 | 230 | 220 | 100 |
| Pore volume* (ml/g) | 0.50 | 0.50 | 0.55 | 0.70 |
| Crystal size (nm) | 4.5 | 5.5 | 7.0 | 40 |

*After activation at 550° C. for 3 hours

The catalyst comprising the base extrudate formed from the HNPV ASA and HNPV alumina generally also comprises at least one modifier selected from Groups 6-10 and Group 14 of the Periodic Table (IUPAC). Suitable Group 6 modifiers include Group 6 elements, e.g., chromium (Cr), molybdenum (Mo), and tungsten (W) and combinations thereof in any of their elemental, compound, or ionic form. Suitable Group 7 modifiers include Group 7 elements, e.g., manganese (Mn), rhenium (Re) and combinations thereof in any of their elemental, compound, or ionic form. Suitable Group 8 modifiers include Group 8 elements, e.g., iron (Fe), ruthenium (Ru), osmium (Os) and combinations thereof in any of their elemental, compound, or ionic form. Suitable Group 9 modifiers include Group 9 elements, e.g., cobalt (Co), rhodium (Rh), iridium (Ir) and combinations thereof in any of their elemental, compound, or ionic form. Suitable Group 10 modifiers include Group 10 elements, e.g., nickel (Ni), palladium (Pd), platinum (Pt) and combinations thereof in any of their elemental, compound, or ionic form. Suitable Group 14 modifiers include Group 14 elements, e.g., germanium (Ge), tin (Sn), lead (Pb) and combinations thereof in any of their elemental, compound, or ionic form. In addition, optional Group 2 modifiers may be present, including Group 2 elements, e.g., magnesium, (Mg), Calcium (Ca), Strontium (Sr), Barium (Ba) and combinations thereof in any of their elemental, compound, or ionic form.

The modifier advantageously comprises one or more Group 10 metals. The Group 10 metal may be, e.g., platinum, palladium or a combination thereof. Platinum is a suitable Group 10 metal along with another Groups 6 to 10 and Group 14 metal in some aspects. While not limited thereto, the Groups 6 to 10 and Group 14 metal may be more narrowly selected from Pt, Pd, Ni, Re, Ru, Ir, Sn, or a combination thereof. In conjunction with Pt as a first metal in the catalyst, an optional second metal in the catalyst may also be more narrowly selected from the second Groups 6 to 10 and Group 14 metal is selected from Pd, Ni, Re, Ru, Ir, Sn, or a combination thereof. In a more specific instance, the catalyst may comprise Pt as a Group 10 metal in an amount of 0.01-5.0 wt. % or 0.01-2.0 wt. %, or 0.1-2.0 wt. %, more particularly 0.01-1.0 wt. % or 0.3-0.8 wt. %. An optional second metal selected from Pd, Ni, Re, Ru, Ir, Sn, or a combination thereof as a Group 6 to 10 and Group 14 metal may be present, in an amount of 0.01-5.0 wt. % or 0.01-2.0 wt. %, or 0.1-2.0 wt. %, more particularly 0.01-1.0 wt. % and 0.01-1.5 wt. %.

The metals content in the catalyst may be varied over useful ranges, e.g., the total modifying metals content for the catalyst may be 0.01-5.0 wt. % or 0.01-2.0 wt. %, or 0.1-2.0 wt. % (total catalyst weight basis). In some instances, the catalyst comprises 0.1-2.0 wt. % Pt as one of the modifying metals and 0.01-1.5 wt. % of a second metal selected from Groups 6 to 10 and Group 14, or 0.3-1.0 wt. % Pt and 0.03-1.0 wt. % second metal, or 0.3-1.0 wt. % Pt and 0.03-0.8 wt. % second metal. In some cases, the ratio of the first Group 10 metal to the optional second metal selected from Groups 6 to 10 and Group 14 may be in the range of 5:1 to 1:5, or 3:1 to 1:3, or 1:1 to 1:2, or 5:1 to 2:1, or 5:1 to 3:1, or 1:1 to 1:3, or 1:1 to 1:4.

The catalyst may further comprise an additional matrix material selected from alumina, silica, ceria, titania, tungsten oxide, zirconia, or a combination thereof. In more specific cases, the first catalyst comprises 0.01 to 5.0 wt. % of the modifying metal, 1 to 99 wt. % of the matrix material, and 0.1 to 99 wt. % of the HNPV ASA/HNPV alumina base extrudate. The catalyst may also be more narrowly described, e.g., the catalyst may comprise 0.01 to 5.0 wt. % of the modifier, 15 to 85 wt. % of the matrix material, and 15 to 85 wt. % of the HNPV ASA/HNPV alumina or HNPV ASA/non-HNPV alumina base extrudate. More than one matrix material may be used, e.g., the matrix material may comprise about 15-65 wt. % of a first matrix material and about 15-65 wt. % of a second matrix material. In such cases, the first and second matrix materials generally differ in one or more features, such as the type of material or the pore volume and pore distribution characteristics. Where one or more matrix material is used, the first, second (and any other) matrix materials may also be the same type of matrix material, e.g., the matrix material may comprise one or more aluminas.

The catalyst base extrudate is also suitably characterized by pore volume, both in terms of total pore volume and the pore volume within certain average pore diameter ranges. As with the HNPV ASA and aluminas, the base extrudate may be characterized according to pore volumes in the 6-11 nm pore diameter range, the 11-20 nm pore diameter range, and the 20-50 nm pore diameter range. In general, the base extrudate has a total pore volume in the 2-50 nm pore diameter range of 0.12 to 1.80 cc/g, or, more particularly, a total pore volume in the 2-50 nm pore diameter range of 0.40 to 1.65 cc/g, or a total pore volume in the 2-50 nm pore diameter range of 0.5 to 1.50 cc/g.

Independently, or in addition to the foregoing total pore volume 2-50 nm ranges, the base extrudate may have a pore volume in the 6-11 nm pore diameter range of 0.2 to 1.2 cc/g, or a pore volume in the 6-11 nm pore diameter range of 0.3 to 1.1 cc/g, or a pore volume in the 6-11 nm pore diameter range of 0.4 to 1.0 cc/g. Independently, or in addition to the foregoing 6-11 nm pore volume and 2-50 nm total pore volume ranges, the base extrudate may have a pore volume in the 11-20 nm pore diameter range of 0.01 to 0.40 cc/g, or a pore volume in the 11-20 nm pore diameter range of 0.02 to 0.35 cc/g, or a pore volume in the 11-20 nm pore diameter range of 0.03 to 0.30 cc/g. Independently, or in addition to the foregoing 6-11 nm and 11-20 nm pore volume ranges, and 2-50 nm total pore volume ranges, the base extrudate may have a pore volume in the 20-50 nm pore diameter range of less than about 0.03 cc/g, or a pore volume in the 20-50 nm pore diameter range of less than about 0.02 cc/g, or a pore volume in the 20-50 nm pore diameter range of less than about 0.01 cc/g.

The base extrudate may be made according to any suitable method. For example, the base extrudate may be conveniently made by mixing the components together and extruding the well mixed HNPV ASA/HNPV alumina or HNPV ASA/non-HNPV alumina base material to form the base extrudate. The extrudate is next dried and calcined, followed by loading of any modifiers onto the base extrudate. Suitable impregnation techniques may be used to disperse the modifiers onto the base extrudate. The method of making the base extrudate is not intended to be particularly limited according to specific process conditions or techniques, however.

The hydrocarbon feed may generally be selected from a variety of base oil feedstocks, and advantageously comprises gas oil; vacuum gas oil; long residue; vacuum residue; atmospheric distillate; heavy fuel; oil; wax and paraffin; used oil; deasphalted residue or crude; charges resulting from thermal or catalytic conversion processes; shale oil; cycle oil; animal and vegetable derived fats, oils and waxes; petroleum and slack wax; or a combination thereof. The hydrocarbon feed may also comprise a feed hydrocarbon cut in the distillation range from 400-1300° F., or 500-1100° F., or 600-1050° F., and/or wherein the hydrocarbon feed has a KV100 (kinematic viscosity at 100° C.) range from about 3 to 30 cSt or about 3.5 to 15 cSt.

The hydrocarbon feed may undergo initial hydroprocessing steps prior to being subjected to the present hydrotreating process. While not limited thereto, or required, such initial hydroprocessing steps may include hydrodesulfurization, hydrodenitrogenation, hydrodemetallation, and/or hydrodearomatization of components (e.g., impurities) of a hydrocarbon feedstock. It is also possible to subject the hydrocarbon feed to initial hydroprocessing to improve certain characteristics of the hydrocarbon feed, such as, e.g., the viscosity characteristics. In some cases, the hydrotreating process may be used advantageously in combination with (e.g., following) a hydroisomerization process for a light or heavy neutral base oil feedstock, such as a vacuum gas oil (VGO). The hydrotreating process may then be implemented following such initial hydroprocessing by contacting the hydrocarbon feed and the catalyst formed from the HNPV ASA/alumina base extrudate.

In some cases, the process may be used advantageously for a light or heavy neutral base oil feedstock, such as a vacuum gas oil (VGO), as the hydrocarbon feed where the HNPV ASA/HNPV alumina or HNPV ASA/non-HNPV alumina catalyst includes a Pt modifying metal, or a combination of Pt with another modifier.

The product(s), or product streams, may be used to produce one or more base oil products, e.g., to produce multiple grades having a KV100 in the range of about 2 to 30 cSt. Such base oil products may, in some cases, have a pour point of not more than about −5° C., or −12° C., or −14° C.

The process and system may also be combined with additional process steps, or system components, e.g., the feedstock may be further subjected to other hydroprocessing conditions with a hydroprocessing catalyst prior to contacting the hydrocarbon feed with the HNPV ASA/HNPV alumina or HNPV ASA/non-HNPV alumina hydrotreating catalyst. Additional optional layered catalysts may also be used, e.g., wherein the hydrotreating catalyst comprises a guard layer catalyst comprising a refractory inorganic oxide material containing about 0.1 to 1 wt. % Pt and about 0.2 to 1.5 wt. % Pd.

Among the advantages provided by the present process and catalyst system, are the improvement in base oil product characteristics (e.g., reduced aromatics content) using the inventive catalyst system comprising the HNPV ASA and HNPV alumina or HNPV ASA/non-HNPV alumina base extrudate (referred to herein as "HNPV ASA/HNPV alumina" and "HNPV ASA/non-HNPV alumina" base extrudate and catalyst), as compared with the same process wherein a similar catalyst comprising a base extrudate formed from a non-HNPV ASA and HNPV alumina (hereinafter referred to as "non-HNPV ASA/HNPV alumina" base extrudate and catalyst) or formed from a non-HNPV ASA and non-HNPV alumina (hereinafter referred to as "non-HNPV ASA/non-HNPV alumina" base extrudate and catalyst) is used that does not contain the HNPV ASA component having a pore volume in the 11-20 nm pore diameter range of 0.2 to 0.9 cc/g (or, in more specific cases, 0.25 to 0.8 cc/g, or 0.3 to 0.7 cc/g). In addition, in some cases, the base oil product aromatics content is notably reduced by at least about 0.5 wt. %, or 1.0 wt. %, or 1.5 wt. %, or 2.0 wt. %, when the inventive HNPV ASA/HNPV alumina or HNPV ASA/non-HNPV alumina catalyst is used, as compared with the use, in the same process, of such a similar non-HNPV ASA/HNPV alumina or non-HNPV ASA/non-HNPV alumina catalyst. The base oil product aromatics content may also be characterized in terms of an increased aromatics saturation conversion, wherein the base oil product aromatics saturation conversion is notably increased by at least about 0.5 wt. %, or 1.0 wt. %, or 1.5 wt. %, or 2.0 wt. %, when the inventive HNPV ASA/HNPV alumina or HNPV ASA/non-HNPV alumina catalyst is used, as compared with the use, in the same process, of such a similar non-HNPV ASA/HNPV alumina or non-HNPV ASA/non-HNPV alumina catalyst.

In practice, hydrodewaxing is used primarily for reducing the pour point and/or for reducing the cloud point of the base oil by removing wax from the base oil. Typically, dewaxing uses a catalytic process for processing the wax, with the dewaxer feed is generally upgraded prior to dewaxing to increase the viscosity index, to decrease the aromatic and heteroatom content, and to reduce the amount of low boiling components in the dewaxer feed. Some dewaxing catalysts accomplish the wax conversion reactions by cracking the waxy molecules to lower molecular weight molecules. Other dewaxing processes may convert the wax contained in the hydrocarbon feed to the process by wax isomerization, to produce isomerized molecules that have a lower pour point than the non-isomerized molecular counterparts. As used herein, isomerization encompasses a hydroisomerization process, for using hydrogen in the isomerization of the wax molecules under catalytic hydroisomerization conditions.

Suitable hydrodewaxing and/or hydrotreating conditions generally depend on the feed used, the catalyst used, desired yield, and the desired properties of the base oil. Typical conditions include a temperature of from 500° F. to 775° F. (260° C. to 413° C.); a pressure of from 15 psig to 3000 psig (0.10 MPa to 20.68 MPa gauge); a LHSV of from 0.25 $hr^{-1}$ to 20 $hr^{-1}$; and a hydrogen to feed ratio of from 2000 SCF/bbl to 30,000 SCF/bbl (356 to 5340 $m^3$ $H_2/m^3$ feed). Generally, hydrogen will be separated from the product and recycled to the isomerization zone. Generally, dewaxing processes of the present invention are performed in the presence of hydrogen. Typically, the hydrogen to hydrocarbon ratio may be in a range from about 2000 to about 10,000 standard cubic feet $H_2$ per barrel hydrocarbon, and usually from about 2500 to about 5000 standard cubic feet $H_2$ per barrel hydrocarbon. Such conditions may apply to the hydrotreating conditions of the hydrotreating zone as well as to the hydroisomerization conditions of the first and second catalyst. Suitable dewaxing conditions and processes are described in, e.g., U.S. Pat. Nos. 5,135,638; 5,282,958; and 7,282,134.

Suitable catalyst systems generally include a catalyst comprising an HNPV ASA/HNPV alumina and/or an HNPV ASA/non-HNPV alumina catalyst, arranged so that the feedstock contacts the HNPV ASA/HNPV alumina and/or the HNPV ASA/non-HNPV alumina catalyst prior to further hydrofinishing steps. The HNPV ASA/HNPV alumina and/or an HNPV ASA/non-HNPV alumina catalyst may be used by itself, in combination with other catalysts, and/or in a layered catalyst system. Additional treatment steps and catalysts may be included, e.g., as noted, hydrotreating catalyst(s)/steps, guard layers, and/or hydrofinishing catalyst(s)/steps.

EXAMPLES

The HNPV amorphous silica alumina and HNPV alumina used in the following examples were provided as commercially available silica aluminas and aluminas in accordance with the foregoing description. A comparative commercially available non-HNPV alumina was also used for comparative catalysts. The properties of these materials used in the examples are shown in Table 3.

TABLE 3

| Property | non-HNPV alumina | HNPV alumina I | HNPV alumina II | non-HNPV ASA | HNPV ASA |
|---|---|---|---|---|---|
| d10 (nm) | 3.8 | 6.9 | 8.9 | 3.5 | 6 |
| d50 (nm) | 6.7 | 14.7 | 19.1 | 7.3 | 10.9 |
| d90 (nm) | 9.6 | 20.1 | 23.9 | 16.1 | 28.6 |
| Peak Pore Diameter (nm) | 7.3 | 16.7 | 21.4 | 5.7 | 8.9 |
| Nanopore Volume (NPV) in the pore diameter range: | | | | | |
| 6 nm-11 nm (cc/g) | 0.33 | 0.18 | 0.12 | 0.41 | 0.7 |
| 11 nm-20 nm (cc/g) | 0.03 | 0.54 | 0.43 | 0.16 | 0.5 |
| 20 nm-50 nm (cc/g) | 0 | 0.09 | 0.45 | 0.06 | 0.34 |
| Total NPV (2-50 nm) (cc/g) | 0.55 | 0.87 | 1.04 | 0.98 | 1.71 |
| BET surface area (m$^2$/g) | 296 | 226 | 218 | 540 | 528 |

Example 1—Hydrotreating Catalyst a Preparation

A comparative hydrotreating catalyst A was prepared as follows: 85% conventional (non-HNPV) amorphous silica alumina was composited with conventional (non-HVPV) alumina (Catapal®), and the mixture was extruded, dried, and calcined. The dried and calcined extrudate was impregnated with a solution containing platinum and palladium. The overall noble metal loading was 0.54 wt. %.

Example 2—Hydrotreating Catalyst B Preparation

Hydrotreating catalyst B was prepared as described for Catalyst A to provide a mixture containing 80 wt. % HNPV ASA and 20 wt. % HNPV alumina. The dried and calcined extrudate was impregnated with platinum and palladium to provide an overall noble metal loading of 0.54 wt. %. After drying, the catalyst was calcined at 750° F.

Example 3—Hydrotreating Catalyst C Preparation

Hydrotreating catalyst C was prepared as described for Catalyst B to provide a mixture containing HNPV ASA and 20 wt. % HNPV alumina. The dried and calcined extrudate was impregnated with platinum and palladium to provide an overall noble metal loading of 0.54 wt. %. After drying, the catalyst was calcined at 842° F. The catalyst properties are listed in Table 4 for catalysts A and B. Catalyst C used the same extrudate as catalyst B and has the same pore properties as catalyst B.

TABLE 4

| Catalyst | Catalyst A | Catalyst B |
|---|---|---|
| d10 (nm) | 3.8 | 4.2 |
| d50 (nm) | 7.3 | 6.9 |
| d90 (nm) | 12.3 | 9.3 |
| Peak Pore Diameter (nm) | 7.1 | 6.9 |
| NPV - 6 nm-11 nm (cc/g) | 0.41 | 0.59 |
| NPV - 11 nm-20 nm (cc/g) | 0.09 | 0.04 |
| NPV - 20 nm-50 nm (cc/g) | 0.02 | 0.01 |
| Total NPV (2-50 nm) (cc/g) | 0.76 | 0.92 |
| BET surface area (m$^2$/g) | 371 | 399 |

Example 4—Hydrotreating Performance for Catalysts A, B, and C

Catalysts A, B, and C were used to hydrotreat a dewaxed heavy neutral feedstock having the properties shown in Table 5.

TABLE 5

| Feedstock Property | Value |
|---|---|
| viscosity index at 100° C. (cSt) | 12.07 |
| gravity, °API | 30.6 |
| Cloud Point, °C. | −11 |
| Pour Point, °C | −20 |
| Sulfur content, wt. % | 5.9 |
| Aromatics content, wt. % | 4.2 |

The hydrotreating reaction was performed in a micro unit equipped with down flow reactor. The run was operated under 2100 psig total pressure. Prior to the introduction of feed, the catalysts were activated by a standard reduction procedure. The feed was passed through the reactor at a liquid hour space velocity (LHSV) of 1.2. The hydrogen to oil ratio was about 3000 scfb. The hydrotreating reaction temperature was adjusted in the range of 350-550° F. Results for the aromatics conversion for each of catalysts A, B, and C are shown in Table 6.

TABLE 6

| Catalyst | Aromatics Conversion (%) |
|---|---|
| Catalyst A | 89.8 |
| Catalyst B | 92.2 |
| Catalyst C | 91.4 |

Compared to catalyst A having a non-HNPV ASA/non-HNPV alumina base extrudate component, catalyst B having an HNPV ASA/HNPV alumina base extrudate component demonstrated increased aromatics saturation conversion of about 2.2% for catalyst B and 1.6% for catalyst C, respectively, compared with catalyst A.

The present application is to be understood as being directed to the full scope of the subject matter claims coverage described in the following numbered paragraphs P1 to P24:

P1. A hydrotreating catalyst, useful to make dewaxed products including base oils having reduced aromatics content, comprising
a base extrudate comprising an amorphous silica alumina (ASA) and an alumina, wherein
the amorphous silica alumina has a pore volume in the 11-20 nm pore diameter range of 0.2 to 0.9 cc/g;
the alumina has a pore volume in the 11-20 nm pore diameter range of 0.01 to 1.0 cc/g; and
the base extrudate has a total pore volume in the 2-50 nm pore diameter range of 0.12 to 1.80 cc/g; and
at least one modifier selected from Groups 6 to 10 and Group 14 of the Periodic Table.

P2. The catalyst according to paragraph P1, wherein the modifier comprises a Group 8-10 metal of the Periodic Table.

P3. The catalyst according to paragraph P2, wherein the modifier is a Group 10 metal comprising Pt, Pd, or a combination thereof.

P4. The catalyst according to any of paragraphs P1 to P3, wherein the amorphous silica alumina has a pore volume in the 6-11 nm pore diameter range of 0.1 to 1.2 cc/g, or a pore volume in the 6-11 nm pore diameter range of 0.2 to 1.0 cc/g, or a pore volume in the 6-11 nm pore diameter range of 0.3 to 0.9 cc/g.

P5. The catalyst according to any of paragraphs P1 to P4, wherein the amorphous silica alumina has a pore volume in the 11-20 nm pore diameter range of 0.25 to 0.8 cc/g, or a pore volume in the 11-20 nm pore diameter range of 0.3 to 0.7 cc/g.

P6. The catalyst according to any of paragraphs P1 to P5, wherein the amorphous silica alumina has a pore volume in the 20-50 nm pore diameter range of 0.05 to 0.7 cc/g, or a pore volume in the 20-50 nm pore diameter range of 0.1 to 0.6 cc/g or a pore volume in the 20-50 nm pore diameter range of 0.15 to 0.5 cc/g.

P7. The catalyst according to any of paragraphs P1 to P6, wherein the amorphous silica alumina has a total pore volume in the 2-50 nm pore diameter range of 0.3 to 2.2 cc/g, or a total pore volume in the 2-50 nm pore diameter range of 0.4 to 2.1 cc/g, or a total pore volume in the 2-50 nm pore diameter range of 0.5 to 2.0 cc/g.

P8. The catalyst according to any of paragraphs P1 to P7, wherein the alumina has a pore volume in the 6-11 nm pore diameter range of 0.05 to 1.0 cc/g, or a pore volume in the 6-11 nm pore diameter range of 0.06 to 0.8 cc/g, or a pore volume in the 6-11 nm pore diameter range of 0.07 to 0.6 cc/g.

P9. The catalyst according to any of paragraphs P1 to P8, wherein the alumina has a pore volume in the 11-20 nm pore diameter range of 0.2 to 1.0 cc/g, or a pore volume in the 11-20 nm pore diameter range of 0.2 to 0.9 cc/g, or a pore volume in the 11-20 nm pore diameter range of 0.3 to 0.85 cc/g, or a pore volume in the 11-20 nm pore diameter range of 0.4 to 0.7 cc/g.

P10. The catalyst according to any of paragraphs P1 to P8, wherein the alumina has a pore volume in the 11-20 nm pore diameter range of less than about 0.2 cc/g, or a pore volume in the 11-20 nm pore diameter range of less than about 0.1 cc/g, or a pore volume in the 11-20 nm pore diameter range of less than about 0.05 cc/g.

P11. The catalyst according to any of paragraphs P1 to P10, wherein the alumina has a pore volume in the 20-50 nm pore diameter range of 0.05 to 1.0 cc/g, or a pore volume in the 20-50 nm pore diameter range of 0.07 to 0.8 cc/g, or a pore volume in the 20-50 nm pore diameter range of 0.09 to 0.6 cc/g.

P12. The catalyst according to any of paragraphs P1 to P11, wherein the alumina has a total pore volume in the 2-50 nm pore diameter range of 0.3 to 2.0 cc/g, or a total pore volume in the 2-50 nm pore diameter range of 0.5 to 1.75 cc/g, or a total pore volume in the 2-50 nm pore diameter range of 0.7 to 1.5 cc/g.

P13. The catalyst according to any of paragraphs P1 to P12, wherein the base extrudate has a pore volume in the 6-11 nm pore diameter range of 0.2 to 1.2 cc/g, or a pore volume in the 6-11 nm pore diameter range of 0.3 to 1.1 cc/g, or a pore volume in the 6-11 nm pore diameter range of 0.4 to 1.0 cc/g.

P14. The catalyst according to any of paragraphs P1 to P13, wherein the base extrudate has a pore volume in the 11-20 nm pore diameter range of 0.01 to 0.4 cc/g, or a pore volume in the 11-20 nm pore diameter range of 0.02 to 0.35 cc/g, or a pore volume in the 11-20 nm pore diameter range of 0.03 to 0.30 cc/g.

P15. The catalyst according to any of paragraphs P1 to P14, wherein the base extrudate has a pore volume in the 20-50 nm pore diameter range of less than about 0.03 cc/g, or less than about 0.02 cc/g, or less than about 0.01 cc/g.

P16. The catalyst according to any of paragraphs P1 to P15, wherein the base extrudate has a total pore volume in the 2-50 nm pore diameter range of 0.4 to 1.65 cc/g, or a total pore volume in the 2-50 nm pore diameter range of 0.5 to 1.50 cc/g.

P17. The catalyst according to any of paragraphs P1 to P16, wherein the modifier content is 0.01-5.0 wt. %, or 0.01-2.0 wt. %, or 0.1-2.0 wt. % (total catalyst weight basis).

P18. The catalyst according to any of paragraphs P1 to P17, wherein the catalyst comprises Pt, Pd, or a combination of Pt and Pd, as a modifier in an amount of 0.01-1.0 wt. %, or 0.1-0.8 wt. % Pt.

P19. The catalyst according to any of paragraphs P1 to P18, wherein the catalyst further comprises a matrix material selected from alumina, silica, ceria, titania, tungsten oxide, zirconia, or a combination thereof.

P20. The catalyst according to paragraph P19, wherein the catalyst comprises 0.01 to 5.0 wt. % of the modifier, 0 to 99 wt. % of the matrix material, and 0.1 to 99 wt. % of the base extrudate.

P21. A process for producing a hydrotreated base oil product having increased aromatics saturation conversion, the process comprising contacting a hydrocarbon feed with the hydrotreating catalyst according to any of paragraphs P1 to P20 under hydrotreating conditions to produce a base oil product.

P22. The process according to paragraph P21, wherein the hydrocarbon feed comprises gas oil; vacuum gas oil; long residue; vacuum residue; atmospheric distillate; heavy fuel; oil; wax and paraffin; used oil; deasphalted residue or crude; charges resulting from thermal or catalytic conversion processes; shale oil; cycle oil; animal and vegetable derived fats, oils and waxes; petroleum and slack wax; or a combination thereof.

P23. The process according to any of paragraphs P21 to P22, wherein the aromatics saturation conversion is increased using the hydrotreating catalyst according to any of paragraphs P1 to P20 as compared with the same process using a comparative hydrotreating catalyst that differs only in that the amorphous silica alumina component does not have a pore volume in the 11-20 nm pore diameter range of 0.2 to 0.9 cc/g, or 0.25 to 0.8 cc/g, or 0.3 to 0.7 cc/g.

P24. The process according to any of paragraphs P21 to P23, wherein the aromatics saturation conversion increase is at least about 0.5 wt. %, or 1.0 wt. %, or 1.5 wt. %, or 2.0 wt. %.

The present disclosure is not to be limited in terms of the particular embodiments described in this application, which are intended as illustrations of various aspects. Many modifications and variations can be made without departing from its spirit and scope, as may be apparent. Functionally equivalent methods and systems within the scope of the disclosure, in addition to those enumerated herein, may be apparent from the foregoing representative descriptions.

Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, in some cases, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

For the purposes of U.S. patent practice, and in other patent offices where permitted, all patents and publications cited in the foregoing description of the invention are incorporated herein by reference to the extent that any information contained therein is consistent with and/or supplements the foregoing disclosure.

What is claimed is:

1. A process for producing a hydrotreated base oil product, the process comprising contacting a hydrocarbon feed with a hydrotreating catalyst under hydrotreating conditions to produce a base oil product, wherein the hydrotreating catalyst comprises:
    a base extrudate comprising an amorphous silica alumina (ASA) and an alumina, wherein
    the amorphous silica alumina has a pore volume in the 11-20 nm pore diameter range of 0.2 to 0.9 cc/g;
    the alumina has a pore volume in the 11-20 nm pore diameter range of 0.01 to 1.0 cc/g; and
    the base extrudate has a total pore volume in the 2-50 nm pore diameter range of 0.12 to 1.80 cc/g; and
    at least one modifier, wherein the at least one modifier is a Group 10 metal comprising Pt, Pd, or a combination thereof;
    wherein the process provides at least about 0.5 wt. % aromatics saturation conversion increase of an aromatics-containing feedstock based on content of the aromatics in the aromatics-containing feedstock as compared with a same process for producing a hydrotreated base oil product using a comparative hydrotreating catalyst that differs only in that the amorphous silica alumina does not have a pore volume in the 11-20 nm pore diameter range of 0.2 to 0.9 cc/g.

2. The process of claim 1, wherein the hydrocarbon feed comprises gas oil; vacuum gas oil;
    long residue; vacuum residue; atmospheric distillate; heavy fuel; oil; wax and paraffin; used oil;
    deasphalted residue or crude; charges resulting from thermal or catalytic conversion processes; shale oil; cycle oil; animal and vegetable derived fats, oils and waxes; petroleum and slack wax; or a combination thereof.

3. The process of claim 1, wherein the comparative hydrotreating catalyst differs only in that the amorphous silica alumina does not have a pore volume in the 11-20 nm pore diameter range of 0.25 to 0.8 cc/g, or 0.3 to 0.7 cc/g.

4. The process of claim 1, wherein the aromatics saturation conversion increase is at least about 1.0 wt. %, or 1.5 wt. %, or 2.0 wt. %.

5. The process of claim 1, wherein the amorphous silica alumina has a pore volume in the 6-11 nm pore diameter range of 0.1 to 1.2 cc/g, or a pore volume in the 6-11 nm pore diameter range of 0.2 to 1.0 cc/g, or a pore volume in the 6-11 nm pore diameter range of 0.3 to 0.9 cc/g.

6. The process of claim 1, wherein the amorphous silica alumina has a pore volume in the 11-20 nm pore diameter range of 0.25 to 0.8 cc/g, or a pore volume in the 11-20 nm pore diameter range of 0.3 to 0.7 cc/g.

7. The process of claim 1, wherein the amorphous silica alumina has a pore volume in the 20-50 nm pore diameter range of 0.05 to 0.7 cc/g, or a pore volume in the 20-50 nm pore diameter range of 0.1 to 0.6 cc/g or a pore volume in the 20-50 nm pore diameter range of 0.15 to 0.5 cc/g.

8. The process of claim 1, wherein the amorphous silica alumina has a total pore volume in the 2-50 nm pore diameter range of 0.3 to 2.2 cc/g, or a total pore volume in the 2-50 nm pore diameter range of 0.4 to 2.1 cc/g, or a total pore volume in the 2-50 nm pore diameter range of 0.5 to 2.0 cc/g.

9. The process of claim 1, wherein the alumina has a pore volume in the 6-11 nm pore diameter range of 0.05 to 1.0 cc/g, or a pore volume in the 6-11 nm pore diameter range of 0.06 to 0.8 cc/g, or a pore volume in the 6-11 nm pore diameter range of 0.07 to 0.6 cc/g.

10. The process of claim 1, wherein the alumina has a pore volume in the 11-20 nm pore diameter range of 0.2 to 1.0 cc/g, or a pore volume in the 11-20 nm pore diameter range of 0.2 to 0.9 cc/g, or a pore volume in the 11-20 nm pore diameter range of 0.3 to 0.85 cc/g, or a pore volume in the 11-20 nm pore diameter range of 0.4 to 0.7 cc/g.

11. The process of claim 1, wherein the alumina has a pore volume in the 11-20 nm pore diameter range of 0.01 cc/g to less than about 0.2 cc/g, or a pore volume in the 11-20 nm pore diameter range of 0.01 cc/g to less than about 0.1 cc/g, or a pore volume in the 11-20 nm pore diameter range of 0.01 cc/g to less than about 0.05 cc/g.

12. The process of claim 1, wherein the alumina has a pore volume in the 20-50 nm pore diameter range of 0.05 to 1.0 cc/g, or a pore volume in the 20-50 nm pore diameter range of 0.07 to 0.8 cc/g, or a pore volume in the 20-50 nm pore diameter range of 0.09 to 0.6 cc/g.

13. The process of claim 1, wherein the alumina has a total pore volume in the 2-50 nm pore diameter range of 0.3 to 2.0 cc/g, or a total pore volume in the 2-50 nm pore diameter range of 0.5 to 1.75 cc/g, or a total pore volume in the 2-50 nm pore diameter range of 0.7 to 1.5 cc/g.

14. The process of claim 1, wherein the base extrudate has a pore volume in the 6-11 nm pore diameter range of 0.2 to 1.2 cc/g, or a pore volume in the 6-11 nm pore diameter range of 0.3 to 1.1 cc/g, or a pore volume in the 6-11 nm pore diameter range of 0.4 to 1.0 cc/g.

15. The process of claim 1, wherein the base extrudate has a pore volume in the 11-20 nm pore diameter range of 0.01 to 0.4 cc/g, or a pore volume in the 11-20nm pore diameter range of 0.02 to 0.35 cc/g, or a pore volume in the 11-20 nm pore diameter range of 0.03 to 0.30 cc/g.

16. The process of claim 1, wherein the base extrudate has a pore volume in the 20-50 nm pore diameter range of less than about 0.03 cc/g, or less than about 0.02 cc/g, or less than about 0.01 cc/g.

17. The process of claim 1, wherein the base extrudate has a total pore volume in the 2-50 nm pore diameter range of 0.4 to 1.65 cc/g, or a total pore volume in the 2-50 nm pore diameter range of 0.5 to 1.50 cc/g.

18. The process of claim 1, wherein a content of the at least one modifier is 0.01-5.0 wt. %, or 0.01-2.0 wt. %, or 0.1-2.0 wt. % based on a total catalyst weight of the hydrotreating catalyst.

19. The process of claim 1, wherein the hydrotreating catalyst comprises Pt, Pd, or a combination of Pt and Pd, the at least one modifier in an amount of 0.01-1.0 wt. %, or 0.1-0.8 wt. % Pt.

20. The process of claim 1, wherein the hydrotreating catalyst further comprises a matrix material selected from alumina, silica, ceria, titania, tungsten oxide, zirconia, or a combination thereof.

21. The process of claim 20, wherein the hydrotreating catalyst comprises 0.01 to 5.0 wt. % of the at least one modifier, more than 0 to 99 wt. % of the matrix material, and 0.1 to 99 wt. % of the base extrudate.

\* \* \* \* \*